(12) United States Patent
Zhou

(10) Patent No.: US 9,619,657 B2
(45) Date of Patent: Apr. 11, 2017

(54) METHOD AND APPARATUS FOR STORING REDEEM CODE, AND METHOD AND APPARATUS FOR VERIFYING REDEEM CODE

(71) Applicant: TENCENT TECHNOLOGY (SHENZHEN) COMPANY LIMITED, Shenzhen, Guangdong (CN)

(72) Inventor: Jian Zhou, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/646,953

(22) PCT Filed: Oct. 9, 2013

(86) PCT No.: PCT/CN2013/084865
§ 371 (c)(1),
(2) Date: May 22, 2015

(87) PCT Pub. No.: WO2014/079282
PCT Pub. Date: May 30, 2014

(65) Prior Publication Data
US 2015/0278530 A1 Oct. 1, 2015

(30) Foreign Application Priority Data
Nov. 23, 2012 (CN) .......................... 2012 1 0482877

(51) Int. Cl.
*G06F 17/30* (2006.01)
*H04N 7/16* (2011.01)
(Continued)

(52) U.S. Cl.
CPC ......... *G06F 21/60* (2013.01); *G06Q 30/0207* (2013.01)

(58) Field of Classification Search
CPC .......... G06F 17/00; G06F 21/60; G06F 21/60
(Continued)

(56) References Cited

U.S. PATENT DOCUMENTS 8,087,074 B2 12/2011 Popp et al.
8,434,138 B2 4/2013 Popp et al.
(Continued)

FOREIGN PATENT DOCUMENTS

CN 101076807 A 11/2007
CN 102332030 A 1/2012
(Continued)

OTHER PUBLICATIONS

International Search Report for PCT/CN2013/084865, ISA/CN, mailed Jan. 16, 2014.

*Primary Examiner* — Evans Desrosiers
(74) *Attorney, Agent, or Firm* — Harness, Dickey & Pierce, P.L.C.

(57) ABSTRACT

Implementation manners of the present disclosure provide a method and an apparatus for storing a redeem code and a method and an apparatus for verifying a redeem code. The method for storing a redeem code includes: generating a random value, and determining an index of the random value according to an order in which the random value is generated; generating a number pair according to the random value and the index of the random value, mapping the number pair to a string, and generating a redeem code according to the string; and determining a storage location of the random value according to the index of the random value, and saving the random value at the determined storage location.

12 Claims, 3 Drawing Sheets

(51) Int. Cl.
*G06F 21/60* (2013.01)
*G06Q 30/02* (2012.01)

(58) Field of Classification Search
USPC .......................................................... 726/26
See application file for complete search history.

(56) References Cited

U.S. PATENT DOCUMENTS

2013/0062420 A1* 3/2013 Hamman ............... H04L 9/0866
                                                              235/494
2013/0124292 A1* 5/2013 Juthani ................... G06F 21/41
                                                              705/14.26

FOREIGN PATENT DOCUMENTS

| CN | 102752115 A | 10/2012 |
| WO | 2012014231 A1 | 2/2012 |

* cited by examiner

METHOD AND APPARATUS FOR STORING REDEEM CODE, AND METHOD AND APPARATUS FOR VERIFYING REDEEM CODE

CROSS REFERENCE TO RELATED APPLICATIONS

This application is a 371 U.S. National Stage of International Application No. PCT/CN2013/084865, filed on Oct. 9, 2013 and published in Chinese as WO 2014/079282 A1 on May 30, 2014. This application claims priority to Chinese Patent Application No. 201210482877.X, filed with the Chinese Patent Office on Nov. 23, 2012. The disclosures of the above applications are incorporated herein by reference.

FIELD OF THE TECHNOLOGY

Implementation manners of the present disclosure relate to the field of information processing technologies, and in particular, to a method and an apparatus for storing a redeem code and a method and an apparatus for verifying a redeem code.

BACKGROUND OF THE DISCLOSURE

A redeem code is also known as a promo code or a promotion code, and is generally a code used by a developer to promote an actual product or a computer program product. A redeem code generally includes a digit, a character, and the like, for example, YWERE77RMJA9. A user can obtain a computer program or various other physical products by using a redeem code. After the user redeems a redeem code for a program or another physical product, the redeem code generally becomes invalid.

According to existing manners of generating and storing a redeem code, several strings are generated by using a random algorithm, the generated strings are used as redeem codes, and all the redeem codes are completely saved in storage space, for example, in a database. Correspondingly, during verification of a redeem code, the database is searched in a manner of string comparison, so as to determine whether the redeem code exists in the database, or determine whether the redeem code has already been redeemed.

However, according to the existing manner of generating a redeem code, in a case in which there are a very large quantity of redeem codes, repetition may also occur in randomly generated redeem codes, and therefore, during or after generation of redeem codes, a step of removing a repetition of a generated redeem code is further needed, resulting in low efficiency of generating a redeem code. Moreover, because all redeem codes are completely saved in a database, a large amount of storage space is occupied. If the number of digits of a redeem code is reduced simply to save storage space, it cannot be ensured that a success rate of cracking a redeem code is controllable. Further, according to an existing manner of verifying a redeem code, a database, a file, or another storage medium needs to be searched in a manner of full-text comparison, resulting in a large amount of data to be searched and low efficiency of verification.

SUMMARY

Implementation manners of the present disclosure provide a method and an apparatus for storing a redeem code and a method and an apparatus for verifying a redeem code, thereby saving data storage space and improving efficiency of verifying a redeem code while ensuring that a success rate of cracking a redeem code is controllable.

A method for storing a redeem code includes:

generating a random value, and determining an index of the random value according to an order in which the random value is generated;

generating a number pair according to the random value and the index of the random value, mapping the number pair to a string, and generating a redeem code according to the string; and determining a storage location of the random value according to the index of the random value, and saving the random value at the determined storage location, in which the generating a redeem code according to the string comprises:

performing obfuscation processing on the string, to generate the redeem code.

A method for verifying a redeem code includes:

receiving a redeem code, a method for generating the redeem code including:

generating a random value, and determining an index of the random value according to an order in which the random value is generated; and generating a number pair according to the random value and the index of the random value, mapping the number pair to a string, and generating the redeem code according to the string;

acquiring the string according to the redeem code, reversely mapping the string to the number pair, and determining a storage location according to the index of the random value in the number pair; and further determining, when it is determined that a random value stored at the storage location is not redeemed, whether the random value in the number pair is consistent with the random value stored at the storage location, and if yes, determining that verification of the redeem code succeeds, in which the generating a redeem code according to the string comprises:

performing obfuscation processing on the string, to generate the redeem code.

An apparatus for storing a redeem code includes:

memory;

one or more processors; and one or more programs stored in the memory and configured for execution by the one or more processors, the one or more programs comprising the following instruction units:

a random value generation unit, a redeem code generation unit, and a redeem code storage unit, the random value generation unit being configured to generate a random value, and determine an index of the random value according to an order in which the random value is generated;

the redeem code generation unit being configured to generate a number pair according to the random value and the index of the random value, map the number pair to a string, and generate a redeem code according to the string; and the redeem code storage unit being configured to determine a storage location of the random value according to the index of the random value, and save the random value at the determined storage location, in which the generating a redeem code according to the string comprises:

performing obfuscation processing on the string, to generate the redeem code.

An apparatus for verifying a redeem code includes:
memory;
one or more processors; and
one or more programs stored in the memory and configured for execution by the one or more processors, the one or more programs comprising the following instruction units:
a redeem code receiving unit, a storage location determining unit, and a verification unit,
the redeem code receiving unit being configured to receive a redeem code, a method for generating the redeem code including:
generating a random value, and determining an index of the random value according to an order in which the random value is generated; and generating a number pair according to the random value and the index of the random value, mapping the number pair to a string, and generating the redeem code according to the string;
the storage location determining unit being configured to acquire the string according to the redeem code, reversely map the string to the number pair, and determine a storage location according to the index of the random value in the number pair; and
the verification unit being configured to further determine, when it is determined that a random value stored at the storage location is not redeemed, whether the random value in the number pair is consistent with the random value stored at the storage location, and if yes, determine that verification of the redeem code succeeds,
in which the generating a redeem code according to the string comprises:
performing obfuscation processing on the string, to generate the redeem code.

As can be seen from the foregoing technical solutions, according to implementation manners of the present disclosure, a redeem code is set to a mapping rule between a string and a number, and each redeem code consists of a pair of numbers, where one number is a random value, and the other number is an index related to an order in which the random value is generated. During a stage of generating a redeem code, a number pair is mapped to a string pair, and when the redeem code is saved, only a random value needs to be stored. Therefore, in a case of ensuring that a success rate of cracking a redeem code is controllable, data storage space may further be saved. Moreover, in the implementation manners of the present disclosure, during a redeeming step, a string pair is mapped to a number pair for verification, thereby improving efficiency of verifying a redeem code. In addition, the implementation manners of the present disclosure are applicable to various terminals, and the implementation manners of the present disclosure may be used across platforms or across terminals, which achieves a very wide range of application.

DESCRIPTION OF EMBODIMENTS

To make the technical solutions and advantages of the present disclosure clearer, the following further describes the present disclosure in detail with reference to the accompanying drawings.

Figure 1:
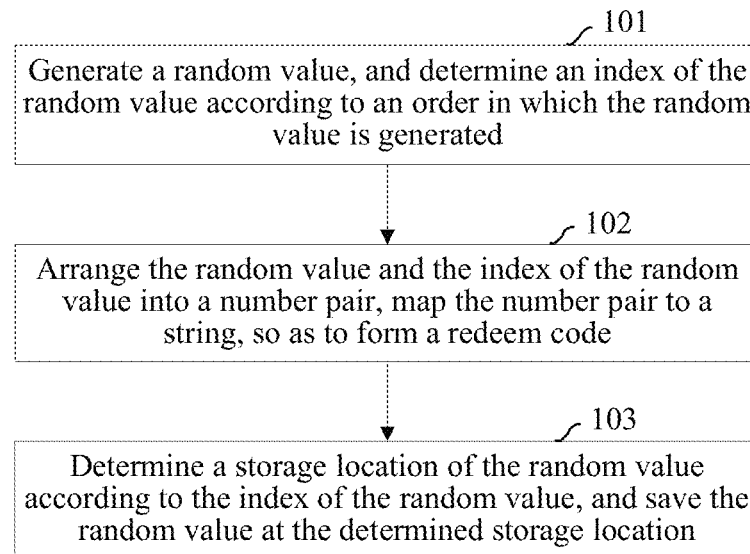
FIG. 1 is a flowchart of a method for storing a redeem code according to an implementation manner of the present disclosure.

FIG. 1 is a flowchart of a method for storing a redeem code according to an implementation manner of the present disclosure. As shown in FIG. 1, the method includes the following steps:

Step 101: A server generates a random value, and determines an index of the random value according to an order in which the random value is generated.

In this step, the random value may be generated by using various random number generation algorithms, and the index of the random value may be determined according to the order in which the random value is generated.

The index of the random value is determined by using the order in which the random value is generated. In an embodiment of the present invention, the index is a continuously incremental positive integer. For example, a random number generation algorithm is applied to generate a random value 123 for a first time, the random number generation algorithm is applied to generate a random value 478 for a second time, and the random number generation algorithm is applied to generate a random value 567 for a third time. It may be determined that an index of the random value 123 is 1, an index of the random value 478 is 2, and an index of the random value 567 is 3.

Step 102: The server arranges the random value and the index of the random value into a number pair, maps the number pair to a string, and uses the string as a redeem code in this case.

In an embodiment of the present invention, an obfuscation operation may further be performed on the string obtained through mapping, and the string obtained after the obfuscation operation is performed is used as the redeem code.

In this step, the random value generated in step 101 and the index of the random value are first arranged into the number pair, the number pair is then mapped to the string, the string pair is obfuscated to form the redeem code.

In the implementation manner of the present disclosure, the number pair may be first mapped to the string pair in multiple manners. One implementation manner is to convert, by using a number-to-string function (num2str), each number in the number pair into a corresponding base-24 string, so as to map the number pair to a string pair. A new string is then formed according to two strings corresponding to these two values, that is, an index value and the random value. The new string is used as a redeem code, and the string (for example, the base-24 string) may further be obfuscated to strengthen security. The obfuscation operation is a program transformation technology that can be used for protecting intellectual property of mobile code and software, and various existing obfuscation algorithms or an obfuscation algorithm that may appear in the future may be used in the implementation manner of the present disclosure.

In an embodiment of the present invention, during a process in which the number pair is converted into the string, numbers from 0 to 23 may be respectively mapped to 24 characters, for example, "0", "1", "2", "3", "4", "5", "6", "7", "8", "9", "A", "B", "C", "D", "E", "F", "G", "H", "I", "J", "K", "L", "M", and "N".

If in step 101, the 50000$^{th}$ random value is 22078136, the number pair is (50000, 22078136), base-24 representation corresponding to the number pair is ("3EJ8", "2ID228"), and the string obtained through mapping in this case is "3EJ82ID228".

Then, the string obtained through mapping may be obfuscated by using various obfuscation algorithms. For example, the string is obfuscated into "3E2ID228J8", so as to use "3E2ID228J8" as a redeem code to be stored.

For another example, it is assumed that in step 101, the 90000$^{th}$ random value is 33069592, the number pair is (90000, 33069592), base-24 representation corresponding to the number pair is ("6C60", "43G4BG"), and the string obtained through mapping in this case is "6C6043G4BG".

Then, the string obtained through mapping may be obfuscated by using various obfuscation algorithms. For example, the string is obfuscated into "6C43G4BG60", so as to use "6C43G4BG60" as a redeem code to be stored.

For another example, it is assumed that in step 101, the 100000$^{th}$ random value is 47892341, the number pair is (100000, 47892341), base-24 representation corresponding to the number pair is ("75EG", "608AA5"), and the string obtained through mapping in this case is "75EG608AA5".

Then, the string obtained through mapping may be obfuscated by using various obfuscation algorithms. For example, the string is obfuscated into "75608AA5EG", so as to use "75608AA5EG" as a redeem code to be stored.

In an embodiment of the present invention, there are some visually similar characters among the characters: "0", "1", "2", "3", "4", "5", "6", "7", "8", "9", "A", "B", "C", "D", "E", "F", "G", "H", "I", "J", "K", "L", "M", and "N", and therefore, "3", "4", "5", "6", "7", "9", "A", "C", "E", "F", "G", "H", "J", "K", "L", "M", "N", "P", "R", "S", "T", "W", "X", and "Y" are preferably used as the 24 characters in base-24 conversion.

Although the implementation manner of the present disclosure is described above in detail by using the base-24 system as an example, a person skilled in the art may realize that the implementation manner of the present disclosure is not limited to the base-24 system, and is applicable to any base-n system and any mapping algorithm.

Step 103: The server determines a storage location of the random value according to the index of the random value, and saves the random value at the determined storage location.

In an embodiment of the present invention, a correspondence between an index and a storage location is saved in a redeem index table.

In this step, the corresponding storage location, of the random value, in the redeem index table may be determined according to the index of the random value in a bitmap, a hash or an array manner, and the random value is saved at the determined storage location.

In an embodiment of the present invention, a redeem state bit corresponding to the random value is further saved in the redeem index table and for indicating a redeeming state of the redeem code corresponding to the random value, that is, whether the redeem code is redeemed.

For example, 1 bit may be used as a redeem state bit, and in this case, memory having storage capacity of 1 Mbyte may store redeeming states of 8 million redeem codes.

When there are a huge number of redeem codes, multiple bits may also be used for representing a redeeming state of a redeem code, which is not limited herein by the implementation manner of the present disclosure.

For example, the 50000$^{th}$ random value is 22078136, and the random value 22078136 may be stored at a storage location corresponding to the index 50000 in the redeem index table. The 90000$^{th}$ random value is 33069592, and the random value 33069592 may be stored at a storage location corresponding to the index 90000 in the redeem index table. The 100000$^{th}$ random value is 47892341, and the random value 47892341 may be stored at a storage location corresponding to the index 10000 in the redeem index table.

In an actual application, the index of the random value does not need to be stored, as long as the storage location of the random value may be determined according to the index value. For example, 22078136 is stored at the 50000$^{th}$ location of an array: (array[5000]=22078136).

In an embodiment of the present invention, an expected generation quantity of the redeem code may also be predetermined, and the number of digits of the index is determined according to the expected generation quantity of the redeem code; and then a probability threshold value of cracking the redeem code is determined, and the number of digits of the random value is determined according to the probability threshold value of cracking the redeem code.

In this case, the generating a random value, and determining an index of the random value according to an order in which the random value is generated in step 101 includes: generating the random value according to the number of digits of the random value, and determining the index of the random value according to the order in which the random value is generated and the number of digits of the index.

An example in which the expected generation quantity is 4 billion and a success probability of cracking is less than one 7.96 millionth is used for description.

24^7=4586471424, and the quantity in the range is more than 4.5 billion, and therefore, an index value may occupy 7 characters. 24^7=7962624, and the quantity in the range is more than 7.96 million, and therefore, a random value may occupy 5 characters. Therefore, the redeem code has 12 characters (12=7+5) in total, 45 billion redeem codes may be generated, and the success probability of cracking is less than one 7.96 millionth.

To further reduce the success rate of cracking, the number of characters of the random value may be increased. For example, when the random value has 6 digits, the success rate of cracking is less than one 190 millionth, and the redeem code totally has 13 characters.

In the method provided in the foregoing embodiment, a string generated by using an index value and a random value is obfuscated, so that it becomes more difficult for an ordinary user to find a rule from the string. Moreover, each character of the index value and each character of the random value may represent a base-24 value, and therefore a meaning represented by one character may be split, where one part represents an index value, and one part represents a random value. For example, the first bit to the 20$^{th}$ bit represent the random value, and the 21$^{st}$ bit to the 24$^{th}$ bit represent the index value. Moreover, during a process of verifying a redeem code, a redeem index table may also be completely placed in memory in a bitmap, a hash or an array manner, to improve efficiency of search.

An implementation manner of the present disclosure further provides a method for verifying a redeem code.

Figure 2:
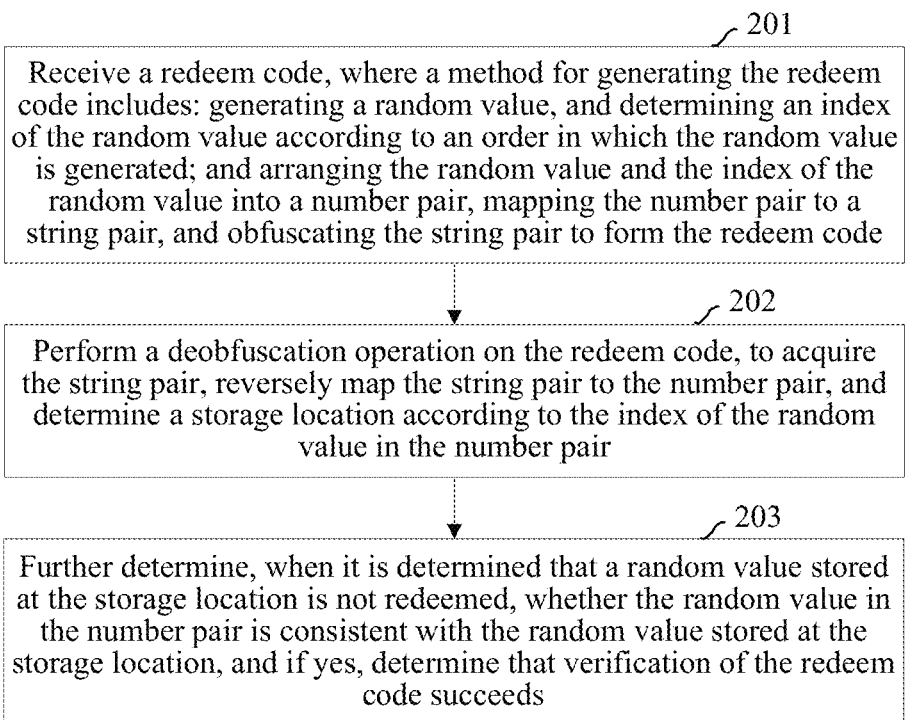
FIG. 2 is a flowchart of a method for verifying a redeem code according to an implementation manner of the present disclosure.

FIG. 2 is a flowchart of a method for verifying a redeem code according to an implementation manner of the present disclosure. As shown in FIG. 2, the method includes the following steps:

Step 201: A server receives a redeem code, where a method for generating the redeem code includes: generating a random value, and determining an index of the random value according to an order in which the random value is generated; and arranging the random value and the index of the random value into a number pair, mapping the number pair to a string, and obfuscating the string pair to form the redeem code.

In this step, the received redeem code may be a redeem code generated according to the method shown in FIG. 1.

Step 202: Perform a deobfuscation operation on the redeem code, to acquire the string corresponding to the redeem code, so as to determine the string pair corresponding to the redeem code, reversely map the string pair to the number pair, and determine a storage location according to the index of the random value in the number pair.

A deobfuscation operation that is reverse to an obfuscation operation in a process of generating the redeem code is first performed on the redeem code, so as to obtain the original string corresponding to the redeem code. The original string is disassembled into the string pair, and then a reverse mapping operation that is reverse to a mapping operation in the process of generating the redeem code is performed, so as to restore the string pair to the number pair, where the number pair includes the random value and the index of the random value. The storage location of the redeem code is further determined according to the index of the random value in the number pair.

Step 203: The server further determines, when determining that a random value stored at the storage location is not redeemed, whether the random value in the number pair is consistent with the random value stored at the storage location, and if yes, determines that verification of the redeem code succeeds.

In an embodiment of the present invention, it may be first determined whether the random value stored at the storage location has already been redeemed, and if the random value stored at the storage location has already been redeemed, it is determined that the verification of the redeem code fails; or if the random value stored at the storage location is not redeemed, it is further determined whether the random value in the number pair is consistent with the random value stored at the storage location, and if the random value in the number pair is consistent with the random value stored at the storage location, it is determined that the verification of the redeem code succeeds, or if the random value in the number pair is inconsistent with the random value stored at the storage location, it is determined that the verification of the redeem code fails.

In this step, it may be determined, according to a redeem state bit in a redeem index table, whether the random value stored at the storage location has already been redeemed. When it is determined that the random value stored at the storage location has already been redeemed, it is determined that the redeem code has already been redeemed before. Therefore, the verification fails.

When it is determined that the random value stored at the storage location is not redeemed, it is determined that the redeem code has not been redeemed before. The redeem index table is further searched to determine whether the random value obtained in step 202 is consistent with the random value stored at the storage location in the redeem index table, and if the random value obtained in step 202 is consistent with the random value stored at the storage location in the redeem index table, it is determined that the verification of the redeem code succeeds, or if the random value obtained in step 202 is inconsistent with the random value stored at the storage location in the redeem index table, it is determined that the verification of the redeem code fails.

In an embodiment of the present invention, in the method, further, when it is determined that the verification of the redeem code succeeds, the redeem state bit, corresponding to the random value, in the redeem index table is updated to be in a redeemed state.

By using the implementation manner of the present disclosure, efficiency of generating a redeem code and efficiency of verifying a redeem code are improved, a process of storing and verifying a redeem code are completely independent of a database, the redeem code is stored and searched according to an index, and a success rate of cracking a redeem code is controllable.

Figure 3:
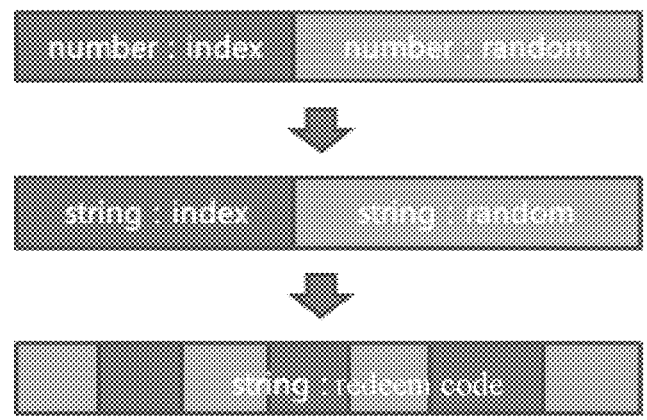
FIG. 3 is a schematic diagram of a process of generating a redeem code according to an implementation manner of the present disclosure.
Figure 4:
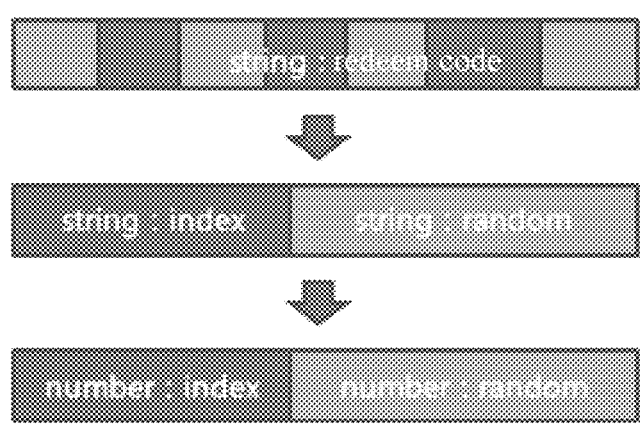
FIG. 4 is a schematic diagram of a process of verifying a redeem code according to an implementation manner of the present disclosure.

FIG. 3 is a schematic diagram of a process of generating a redeem code according to an implementation manner of the present disclosure. FIG. 4 is a schematic diagram of a process of verifying a redeem code according to an implementation manner of the present disclosure.

According to an embodiment of the present invention, an example in which 4 billion redeem codes are generated is used for description.

During a process of generating and storing a redeem code, 4 billion random values in a range of [0, 7962624) are first generated in order. A correspondence between an index and a random value is kept in a redeem index table for use in a subsequent redeeming stage. Index values (input_idx) and random values (input_random) are then converted into 4 billion strings by using a number-to-string function (num2str). 4 billion redeem codes are further formed by the 4 billion strings by using a certain obfuscation algorithm, for example, a change of an order, and are provided for use by a client. Meanwhile, the random values are stored in storage locations corresponding to indexes.

During a process of verifying a redeem code, the redeem code is first restored to a pair of strings by using a deobfuscation operation, and the pair of strings are further converted into a number pair by using a string-to-number function (str2num), where an index value is input_idx, and a random value is input_random. A redeem index table is then searched according to input_idx, where the redeem index table may be a bitmap table, or a hash table or a database table, to determine whether the redeem code has already been redeemed. If the redeem code is not redeemed, a random value, corresponding to input_idx, in the redeem index table is found. The found random value is compared with input_random. If the found random value is the same as input_random, it is determined that verification of the redeem code succeeds, and a redeem state bit corresponding to the redeem code is updated in the redeem index table. If the found random value is different from input_random, it is determined that verification of the redeem code fails.

The method provided in the implementation manner of the present disclosure may be implemented in servers in various forms.

An implementation manner of the present disclosure further provides an apparatus for storing a redeem code.

Figure 5:
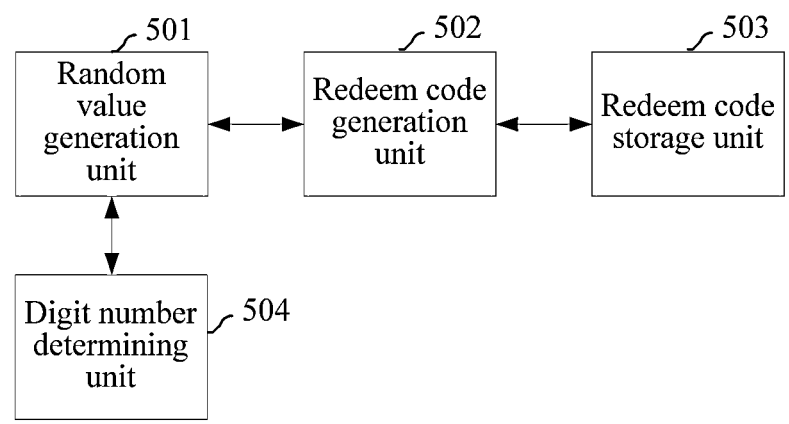
FIG. 5 is a structural diagram of an apparatus for storing a redeem code according to an implementation manner of the present disclosure.

FIG. 5 is a structural diagram of an apparatus for storing a redeem code according to an implementation manner of the present disclosure. As shown in FIG. 5, the apparatus includes a random value generation unit 501, a redeem code generation unit 502, and a redeem code storage unit 503.

The random value generation unit 501 is configured to generate a random value, and determine an index of the random value according to an order in which the random value is generated.

The redeem code generation unit 502 is configured to arrange the random value and the index of the random value into a number pair, and map the number pair to a string, to form a redeem code.

The redeem code storage unit 503 is configured to determine a storage location of the random value according to the index of the random value, and save the random value at the determined storage location.

In an implementation manner, the apparatus further includes a digit number determining unit 504.

The digit number determining unit 504 is configured to determine a quantity of the redeem codes, and determine the number of digits of the index according to the quantity of the redeem code; and determine a probability threshold value of cracking the redeem code, and determine the number of digits of the random value according to the probability threshold value of cracking the redeem code.

The random value generation unit 501 is configured to generate the random value according to the number of digits of the random value, and determine the index of the random value according to the order in which the random value is generated and the number of digits of the index.

According to an embodiment of the present invention, the redeem code storage unit 502 is configured to determine, in a bitmap, a hash or an array manner, the storage location, of the random value, in a redeem index table according to the index of the random value, save the random value at the determined storage location in the redeem index table, and save, in the redeem index table, a redeem state bit indicating whether the random value is redeemed; and is further configured to update, when it is determined that verification of the redeem code succeeds, a state of the redeem state bit of the random value at the storage location in the redeem index table to be redeemed.

An implementation manner of the present disclosure further provides an apparatus for verifying a redeem code.

Figure 6:
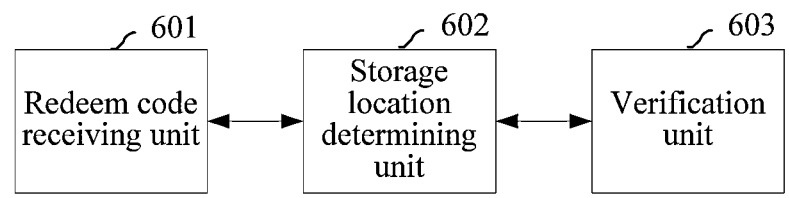
FIG. 6 is a structural diagram of an apparatus for verifying a redeem code according to an implementation manner of the present disclosure.

FIG. 6 is a structural diagram of an apparatus for verifying a redeem code according to an implementation manner of the present disclosure. As shown in FIG. 6, the apparatus includes a redeem code receiving unit 601, a storage location determining unit 602, and a verification unit 603.

The redeem code receiving unit 601 is configured to receive a redeem code, where a method for generating the redeem code includes: generating a random value, and determining an index of the random value according to an order in which the random value is generated; and arranging the random value and the index of the random value into a number pair, mapping the number pair to a string pair, and obfuscating the string pair to form the redeem code.

The storage location determining unit 602 is configured to perform a deobfuscation operation on the redeem code, acquire the string according to the redeem code, reversely map the string to the number pair, and determine a storage location according to the index of the random value in the number pair.

The verification unit 603 is configured to: when it is determined that a random value stored at the storage location is not redeemed, further determine whether the random value in the number pair is consistent with the random value stored at the storage location, and if yes, determine that verification of the redeem code succeeds.

In an embodiment of the present invention, the verification unit 603 determines whether the random value stored at the storage location has already been redeemed; and if the random value stored at the storage location has already been redeemed, determines that the verification of the redeem code fails; or if the random value stored at the storage location is not redeemed, further determines whether the random value in the number pair is consistent with the random value stored at the storage location, and if the random value in the number pair is consistent with the random value stored at the storage location, determines that the verification of the redeem code succeeds, or if the random value in the number pair is inconsistent with the random value stored at the storage location, determines that the verification of the redeem code fails.

In an implementation manner, the verification unit 603 is configured to determine, according to a redeem state bit in a redeem index table, whether the random value stored at the storage location has already been redeemed, and update, when it is determined that the verification of the redeem code succeeds, the redeem state bit, corresponding to the random value, in the redeem index table to be in a redeemed state.

The procedures in the methods shown in FIG. 1 and FIG. 2 and the structures of the apparatuses shown in FIG. 5 and FIG. 6 may be integrated into hardware entities that are in various forms and are used as servers. For example, the procedures of the methods and the structures of the apparatuses may be integrated into a device such as a feature phone, a smart phone, a palmtop computer, a personal computer (PC), a tablet computer, or a personal digital assistant (PDA).

Methods and apparatuses provided by embodiments of the present invention may be implemented by hardware, or a computer readable instruction, or a combination of hardware and a computer readable instruction. The computer-readable instruction used in the embodiments is stored, by using multiple processors, in a readable storage medium, such as a hard disk, a compact disc read-only memory (CD-ROM), a digital versatile disc (DVD), an optical disc, a floppy disk, a magnetic tape, a random access memory (RAM), a read-only memory (ROM) or another suitable storage device. Alternatively, at least a part of a computer-readable instruction may be replaced by specific hardware such as a custom-made integrated circuit, a gate array, a field programmable gate array (FPGA), a programmable logic device (PLD), and a computer with a specific function.

The embodiments of the present invention provide a computer-readable storage medium for storing an instruction, so that a computer performs the method described in this specification. Specifically, systems or devices provided in the embodiments have a storage medium, in which computer-readable program code is stored, for implementing a function of any embodiment described above, and these systems or devices (or central processing units (CPUs) or microprocessor units (MPUs)) can read and perform the program code stored in the storage medium.

In this case, the program code read from the storage medium may implement any embodiment described above, and therefore, the program code and the storage medium storing the program code are a part of the technical solutions.

The storage medium used for providing the program code includes a floppy disk, a hard disk, a magneto-optical disk, an optical disc (such as a CD-ROM, a compact disc recordable (CD-R), a compact disc rewritable (CD-RW), a DVD-ROM, a DVD-RAM, a DVD-RW, a DVD+RW), a magnetic disk, a flash card, and a ROM. Optionally, the program code may also be downloaded from a server computer by using a communications network.

It should be noted that, for the program code executed by the computer, at least a part of operations implemented by the program code may be implemented by an operating system running on the computer, so as to implement the technical solutions of any embodiment described above, where the computer executes an instruction based on the program code.

In addition, the program code in the storage medium is written into a memory, where the memory is located in an expansion card inserted into the computer or is located in an expansion unit connected to the computer. In the embodiments, a CPU in the expansion card or the expansion unit performs, based on the program code, at least a part of operations according to an instruction, so as to implement the technical solutions of any embodiment described above.

Actually, the method for storing and/or verifying a redeem code provided in the implementation manners of the present disclosure may be specifically implemented in multiple manners. For example, an apparatus for running a computer file may be written, by using an application program interface following a certain standard, as a plug-in that is installed in a computer system, or may also be encapsulated into an application program for being downloaded by a user to use. When the apparatus for running a computer file is written as the plug-in, the plug-in may be implemented in multiple forms of plug-ins, for example, an ocx form, a dll form, or a cab form. The apparatus for storing and/or verifying a redeem code provided in the implementation manners of the present disclosure may also be implemented by using a specific technology, such as a Flash plug-in, a RealPlayer plug-in, an MMS plug-in, an MIDI staff plug-in, or an ActiveX plug-in.

In summary, in the implementation manners of the present disclosure, a redeem code is set to a mapping rule between a string and a number, and each redeem code consists of a pair of numbers, where one number is a random value, and the other number is an index related to an order in which the random value is generated. During a stage of generating a redeem code, a number pair is mapped to a string, and when the redeem code is saved, only a random value needs to be stored. Therefore, in a case of ensuring that a success rate of cracking a redeem code is controllable, data storage space may further be saved.

Moreover, in the implementation manners of the present disclosure, during a redeeming stage, a string is mapped to a number pair for verification, thereby improving efficiency of verifying a redeem code.

In addition, the implementation manners of the present disclosure may be applied to various terminals, and the implementation manners of the present disclosure may be used across platforms or across terminals, which has a very wide range of application.

The foregoing descriptions are merely preferred embodiments of the present invention, and are not used to limit the protection scope of the present disclosure. Any modification, equivalent replacement, and improvement made without departing from the spirit and principle of the present disclosure shall fall within the protection scope of the present disclosure.

What is claimed is:

1. A method for storing a redeem code, the method comprising:

generating a random value, and determining an index of the random value according to an order in which the random value is generated;

generating a number pair according to the random value and the index of the random value, mapping the number pair to a string, and generating a redeem code according to the string; and determining a storage location of the random value according to the index of the random value, and saving the random value at the determined storage location;

wherein the generating a redeem code according to the string comprises:

performing obfuscation processing on the string, to generate the redeem code; and wherein the method further comprises:

determining an expected generation quantity of the redeem code, and determining a number of digits of the index according to the expected generation quantity of the redeem code; and determining a probability threshold value of cracking the redeem code, and determining the number of digits of the random value according to the probability threshold value of cracking the redeem code; and the generating a random value, and determining an index of the random value according to an order in which the random value is generated comprises: generating the random value according to the number of digits of the random value, and determining the index of the random value according to the order in which the random value is generated and the number of digits of the index.

2. The method for storing a redeem code according to claim 1, wherein the determining a storage location of the random value according to the index of the random value, and saving the random value comprises:

determining, in a bitmap, a hash or an array manner, the storage location, of the random value, in a redeem index table according to the index of the random value, saving the random value at the storage location, and saving, in the redeem index table, a redeem state bit indicating whether the random value is redeemed.

3. The method for storing a redeem code according to claim 1, wherein the mapping the number pair to a string comprises:

converting, by using a number-to-string function (num2str), each number in the number pair into a corresponding base-24 string representation, and forming the string according to the string representation of each number.

4. A method for verifying a redeem code, the method comprising:

receiving a redeem code, a method for generating the redeem code comprising:

generating a random value, and determining an index of the random value according to an order in which the random value is generated; and generating a number pair according to the random value and the index of the random value, mapping the number pair to a string, and generating the redeem code according to the string;

acquiring the string according to the redeem code, reversely mapping the string to the number pair, and determining a storage location according to the index of the random value in the number pair; and further determining, when it is determined that a random value stored at the storage location is not redeemed, whether the random value in the number pair is consistent with the random value stored at the storage location, and if yes, determining that verification of the redeem code succeeds;

wherein the generating a redeem code according to the string comprises:

performing obfuscation processing on the string, to generate the redeem code;
and
wherein the method further comprises:
determining an expected generation quantity of the redeem code, and
determining a number of digits of the index according to the expected generation quantity of the redeem code; and determining a probability threshold value of cracking the redeem code, and determining the number of digits of the random value according to the probability threshold value of cracking the redeem code; and
the generating a random value, and determining an index of the random value according to an order in which the random value is generated comprises: generating the random value according to the number of digits of the random value, and determining the index of the random value according to the order in which the random value is generated and the number of digits of the index.

5. The method for verifying a redeem code according to claim 4, wherein,
when obfuscation processing is performed on the string during generation of the redeem code, the acquiring the string according to the redeem code comprises:
performing a deobfuscation operation on the redeem code, to acquire the string.

6. The method for verifying a redeem code according to claim 4, wherein,
the mapping the number pair to a string comprises: converting, by using a number-to-string function (num2str), each number in the number pair into a corresponding base-24 string, and forming the string according to the string of each number; and
the reversely mapping the string to the number pair is: converting, by using a string-to-number function (str2num), each base-24 string in the string into the corresponding number, and forming the number pair according to each number.

7. The method for verifying a redeem code according to claim 4, wherein the determining a storage location according to the index of the random value in the number pair is:
determining the storage location in a redeem index table according to the index of the random value in the number pair; and
the determining that a random value stored at the storage location is not redeemed comprises: determining, according to a redeem state bit that is in the redeem index table and indicates whether the random value is redeemed, whether the random value stored at the storage location has already been redeemed, wherein the method further comprises:
updating, when it is determined that verification of the redeem code succeeds, the redeem state bit of the random value at the storage location in the redeem index table to be in a redeemed state.

8. An apparatus for storing a redeem code, the apparatus comprising:
memory;
one or more processors; and
one or more programs stored in the memory and configured for execution by the one or more processors, the one or more programs including:
a random value generation unit, a redeem code generation unit, and a redeem code storage unit;
the random value generation unit being configured to generate a random value, and determine an index of the random value according to an order in which the random value is generated;
the redeem code generation unit being configured to generate a number pair according to the random value and the index of the random value, map the number pair to a string, and generate a redeem code according to the string; and
the redeem code storage unit being configured to determine a storage location of the random value according to the index of the random value, and save the random value at the determined storage location;
wherein the generating a redeem code according to the string comprises:
performing obfuscation processing on the string, to generate the redeem code;
and
wherein the apparatus further comprises a digit number determining unit, wherein,
the digit number determining unit is configured to determine an expected generation quantity of the redeem code, and determine a number of digits of the index according to the expected generation quantity of the redeem code; and determine a probability threshold value of cracking the redeem code, and determine the number of digits of the random value according to the probability threshold value of cracking the redeem code; and
the random value generation unit is configured to generate the random value according to the number of digits of the random value, and determine the index of the random value according to the order in which the random value is generated and the number of digits of the index.

9. The apparatus for storing a redeem code according to claim 8, wherein,
the redeem code storage unit is configured to determine, in a bitmap, a hash or an array manner, the storage location, of the random value, in a redeem index table according to the index of the random value, save the random value at the storage location, and save, in the redeem index table, a redeem state bit indicating whether the random value is redeemed; and is further configured to update, when it is determined that verification of the redeem code succeeds, a state of the redeem state bit of the random value at the storage location in the redeem index table to be redeemed.

10. An apparatus for verifying a redeem code, comprising memory;
one or more processors; and
one or more programs stored in the memory and configured for execution by the one or more processors, the one or more programs including:
a redeem code receiving unit, a storage location determining unit, and a verification unit;
the redeem code receiving unit being configured to receive a redeem code, a method for generating the redeem code comprising:
generating a random value, and determining an index of the random value according to an order in which the random value is generated; and generating a number pair according to the random value and the index of the random value, mapping the number pair to a string, and generating the redeem code according to the string;
the storage location determining unit being configured to acquire the string according to the redeem code, reversely map the string to the number pair, and determine a storage location according to the index of the random value in the number pair; and the verification unit being configured to further determine, when it is determined that a random value stored at the storage location is not redeemed, whether the random value in the number pair is consistent with the random value stored at the storage location, and if yes, determine that verification of the redeem code succeeds;

wherein the generating a redeem code according to the string comprises:

performing obfuscation processing on the string, to generate the redeem code;

wherein the apparatus further comprises a digit number determining unit, wherein, the digit number determining unit is configured to determine an expected generation quantity of the redeem code, and determine a number of digits of the index according to the expected generation quantity of the redeem code; and determine a probability threshold value of cracking the redeem code, and determine the number of digits of the random value according to the probability threshold value of cracking the redeem code; and the generating a random value, and determining an index of the random value according to an order in which the random value is generated comprises: generating the random value according to the number of digits of the random value, and determining the index of the random value according to the order in which the random value is generated and the number of digits of the index.

11. The apparatus for verifying a redeem code according to claim 10, wherein the storage location determining unit is further configured to: when obfuscation processing is performed on the string during generation of the redeem code, perform a deobfuscation operation on the redeem code, to acquire the string.

12. The apparatus for verifying a redeem code according to claim 10, wherein the verification unit is configured to determine, according to a redeem state bit that is in a redeem index table and indicates whether the random value is redeemed, whether the random value stored at the storage location has already been redeemed, and is further configured to: when it is determined that verification of the redeem code succeeds, update the redeem state bit of the random value at the storage location in the redeem index table to be in a redeemed state.

\* \* \* \* \*